No. 616,436. Patented Dec. 20, 1898.
H. F. A. KLEINSCHMIDT.
ELECTRIC WELDING.
(Application filed Feb. 7, 1898.)

(No Model.)

WITNESSES:
C. F. Kress, Jr.
H. Steff.

INVENTOR
H. F. A. Kleinschmidt
BY Richard Lyn
ATTORNEY.

UNITED STATES PATENT OFFICE.

HENRY F. A. KLEINSCHMIDT, OF JOHNSTOWN, PENNSYLVANIA, ASSIGNOR, BY DIRECT AND MESNE ASSIGNMENTS, TO THE LORAIN STEEL COMPANY, OF OHIO.

ELECTRIC WELDING.

SPECIFICATION forming part of Letters Patent No. 616,436, dated December 20, 1898.

Application filed February 7, 1898. Serial No. 669,352. (No model.)

*To all whom it may concern:*

Be it known that I, HENRY F. A. KLEINSCHMIDT, of Johnstown, in the county of Cambria and State of Pennsylvania, have invented new and useful Improvements in Electric Welding, of which the following is a full, clear, and exact description, reference being had to the accompanying drawings, which form a part of this specification.

This invention (Case A) relates to electric welding; and it is my object to provide a novel method for the same by which I am enabled to effect a highly-efficient weld without deteriorating the qualities of the steel and without subjecting the same to severe cooling strains.

The apparatus which I have shown and will describe by which my method can be put into effect is especially applicable for welding splice-bars to rails for the construction of what is known as "continuous railway-track;" but as my invention is also applicable for welding other products I do not desire to limit myself to the welding of continuous rails.

Ordinarily methods of welding tend to destroy the toughness of the metal, because the high heat renders the metal crystalline, and the subsequent upsetting causes the coarse crystals to separate and weaken their hold upon each other. In certain classes of welding, such as when a member is welded to the side of a rail, very severe strains are set up in the rail by the irregular heating and cooling and the sharp local contrasts in the temperature of the metal. This often causes the rail to break below its normal strength. In this same class of welding the burning of the metal under high heat often leaves cavities therein, which are not effectually closed by the ordinary process of upsetting. My invention is designed to obviate all of these troubles; and it consists in upsetting and simultaneously compressing the metal as soon as it is heated to the desired temperature and then retaining said metal under compression and in contact with cold metallic surfaces until the metal has become sufficiently cold to be deprived of nearly all of its plasticity.

Figure 1:
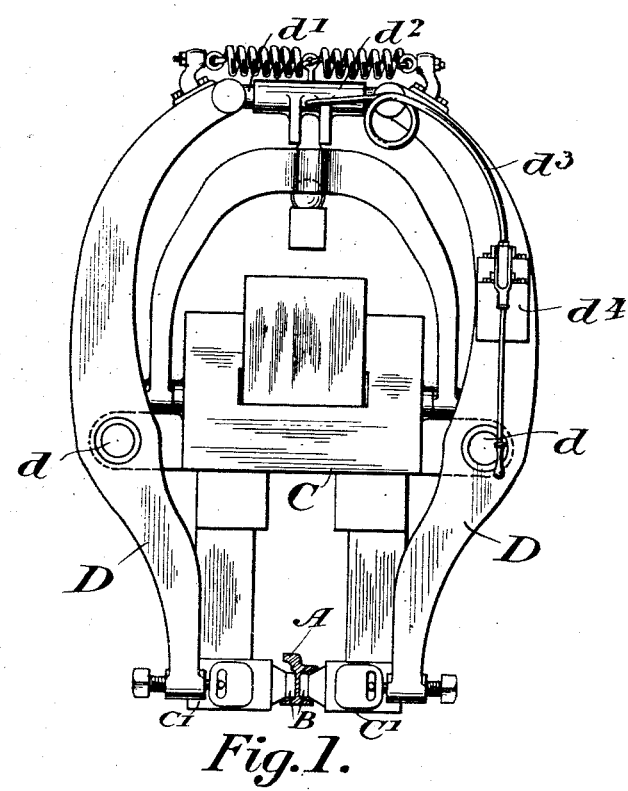
Figure 2:
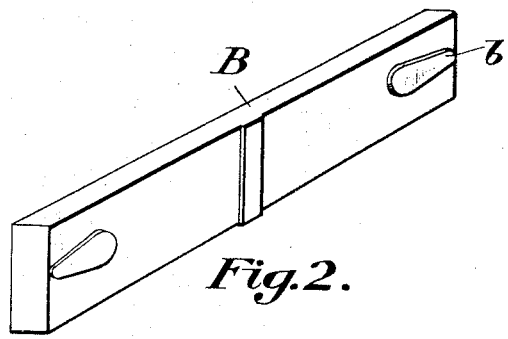
Figure 3:
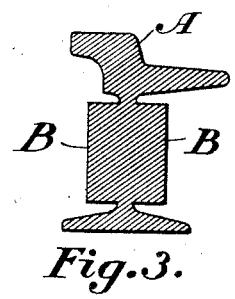

Referring to the drawings, Figure 1 shows an apparatus for welding continuous rails in the street. Fig. 2 shows a splice-bar which is well fitted for use with my improved method. Fig. 3 shows a cross-section of a completed weld between two splice-bars and a rail, taken on a line which would pass through one of the bosses $b$.

A is the rail to which the splice-bars are to be welded.

B are the splice-bars.

C is a stationary electric transformer, having terminals $C'$, adapted to engage the outside of the splice-bars.

D are arms which engage the back of the terminals $C'$, are pivoted at $d$, and are connected at their upper ends to plungers $d'$, moving in a cylinder $d^2$, which receives water through pipes $d^3$, connected with a hand-pump $d^4$.

In welding the bosses $b$ to the rails the splice-bars are laid against the side of the rail and the terminals $C'$ brought to the position shown in Fig. 1. Current is then passed transversely through the rail and the splice-bars until a suitable temperature has been reached, when the pump $d^4$ is operated and the terminals $C'$ moved toward each other with a heavy pressure. The bosses $b$ extend only a very short distance from the main body of the bar, so that they will not prevent the bar from making close engagement with the rail and so that any tendency which they may have to bulge out will be prevented by the rapid cooling and compression to which they are subjected. After upsetting such a weld, whether with light or with heavy pressure, it has been usual to immediately relieve the pressure and remove the transformers from their contact with the bars. In accordance with the present invention, however, the pressure is retained at its maximum for a considerable time, and I have found that this is of the utmost importance. This time will vary under different conditions, but should last until the temperature has fallen sufficiently to remove any considerable degree of plasticity. I find that it is usually safe to remove the pressure if the temperature has fallen sufficiently so that there is practically no glow given off by the cooling metal.

In the specific case shown the rail is about six inches high and is about eight square inches in cross-section. The pressure used is about twenty-five thousand pounds, and it is necessary for the best results to retain the metal under this compression for about two minutes after the heating-current has been shut off. I do not, however, desire to limit myself to these specific details, which I have only set forth as showing what I have found a preferred length of time for a particular form and size of weld.

I do not lay claim in this application to the form of splice-bar which I have shown and described, for this forms the subject-matter of an application for Letters Patent filed by me of even date herewith and serially numbered 669,353.

What I claim, and desire to protect by Letters Patent, is—

1. The method of electrically welding bars to the sides of rails which consists in passing the heating-current transversely through the bars and rail, forming the weld by laterally compressing the bars against the rail, and retaining the bars continuously under compression and in contact with relatively cold metal surfaces until said bars have cooled sufficiently to substantially remove their plasticity.

2. The method of electrically welding bars to the sides of rails which consists in passing the heating-current transversely through the bars and rail, forming the weld by laterally compressing the bars against the rail, and retaining said bars continuously under compression and in contact with cold conducting-surfaces until they have cooled sufficiently to have lost substantially all appearance of glow.

In testimony whereof I have affixed my signature in presence of two witnesses.

HENRY F. A. KLEINSCHMIDT.

Witnesses:
RICHARD EYRE,
MYRTLE E. SHARPE.